F. R. PORTER.
BRAKE MECHANISM.
APPLICATION FILED APR. 12, 1916.
1,265,512.
Patented May 7, 1918.
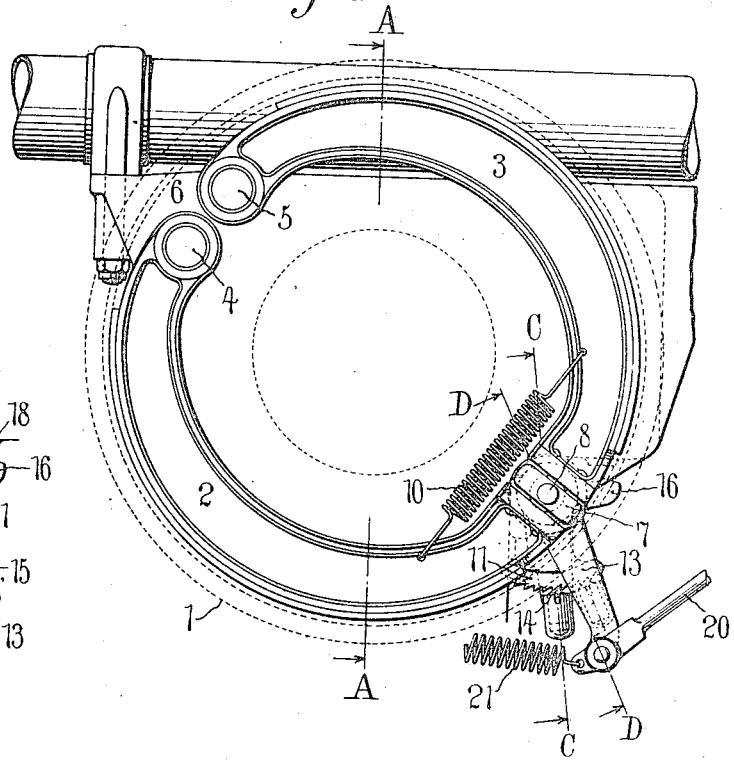
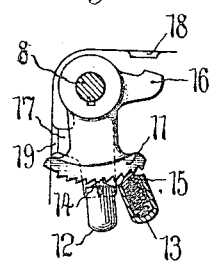
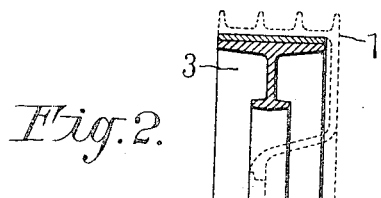
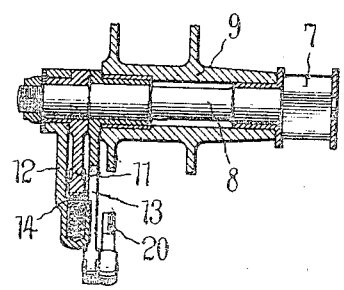
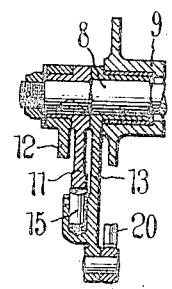
Witness: Harry J. Fleischer
Inventor: Finley R. Porter

UNITED STATES PATENT OFFICE.

FINLEY R. PORTER, OF PORT JEFFERSON, NEW YORK, ASSIGNOR TO FINLEY ROBERTSON PORTER COMPANY, INC., OF PORT JEFFERSON, NEW YORK, A CORPORATION OF DELAWARE.

BRAKE MECHANISM.

1,265,512.   Specification of Letters Patent.   Patented May 7, 1918.

Application filed April 12, 1916. Serial No. 90,661.

*To all whom it may concern:*

Be it known that I, FINLEY R. PORTER, a citizen of the United States, and resident of Port Jefferson, in the county of Suffolk and State of New York, have invented a new and useful Improvement in Brake Mechanisms, of which the following is a specification.

This invention is directed more particularly to brake mechanism of the internal expanding type and includes means controlled by the wearing of the braking surfaces to automatically keep the brake lever properly adjusted to its most effective braking position, said means operating to automatically change the operative position of the brake lever with respect to the shoe expanding cam as the braking surfaces become worn.

A practical embodiment of my invention is represented in the accompanying drawings, in which—

Figure 1 represents the brake mechanism in elevation, the brake drum being shown in dotted lines, the parts being in the positions which they assume when the brake is released, Fig. 2 is a section taken in the plane of the line A—A of Fig. 1, looking in the direction of the arrows, Fig. 3 is a detail section taken in the plane of the line B—B of Fig. 2, looking in the direction of the arrows, Fig. 4 is a detail section taken in the plane of the line C—C of Fig. 1, looking in the direction of the arrows, and Fig. 5 is a detail section taken in the plane of the line D—D of Fig. 1, looking in the direction of the arrows.

The brake drum is denoted by 1, within which is mounted a pair of expanding brake shoes 2, 3, pivoted at 4, 5, to a bracket 6. A cam 7 is interposed between the free ends of the shoes 2, 3, the shaft 8 of which cam is mounted to rock in a suitable support 9. A spring 10 tends to hold the shoes 2, 3, contracted and the brake released.

A toothed segment or ratchet 11 is keyed or otherwise secured to the cam shaft 8. A trip lever 12 and a brake lever 13 are loosely mounted on the rock shaft 8 upon opposite sides of the ratchet 11. The trip lever 12 is provided with a spring-pressed pawl 14 and the brake lever 13 is also provided with a spring-pressed pawl 15 both of which pawls engage the teeth of the ratchet 11.

The trip lever 12 is provided with two abutments 16, 17, arranged to engage the fixed stops 18, 19, respectively, to limit the forward and rearward rocking movements of said trip lever. The brake lever 13 is provided with a connecting rod 20 leading to any suitable operating mechanism.

A coil spring 21 tends to return the brake lever 13 to the limit of its rearward movement.

In operation, as the brake lever is moved forwardly to apply the brake, it will, through its pawl and ratchet connection with the cam shaft 8, rock the cam 7 to spread the shoes 2, 3, into braking engagement with the drum 1. If the brake lever in its forward movement fails to sufficiently apply the brake before the abutment 16 of the trip lever 12 engages its fixed stop 18, the further forward movement of the brake lever 13 will cause the trip lever pawl 14 to slip over one or more of the teeth of the ratchet until the brake is properly applied. As the brake is released by the return of the brake lever 13 to the limit of its rearward movement, the abutment 17 of the trip lever 12 will engage the fixed stop 19 thus causing the pawl 15 of the brake lever to slip over one or more teeth of the ratchet 11 before the brake lever reaches the limit of its rearward movement. When the brake is next applied, sufficient pressure will be exerted by the shoes before the coaction of the fixed stop 18 with the abutment 16 causes another slippage of the trip lever pawl 14 along the ratchet 11. However, as the braking surfaces become worn, the brake lever in time will be caused to move sufficiently far forward to again cause the coaction of the abutments 16 and 17, with their fixed stops 18 and 19 to again change the position of the brake lever 13 with respect to the cam 7. This wear compensating device will, therefore, work automatically until the braking surfaces have been entirely worn away when new braking surfaces may be applied and the parts reset. It will thus be seen that no manual means need be employed for properly setting the brake lever with respect to the brake to obtain the most efficient braking condition.

It is evident that slight changes may be resorted to in the form, construction and arrangement of the several parts without departing from the spirit and scope of my invention; hence I do not wish to limit myself strictly to the structure herein set forth, but

What I claim is:—

1. In a brake mechanism, a drum, brake shoes, a brake lever, means operated thereby for expanding the shoes into frictional engagement with the drum and wear compensating means forming the operative connection between the brake lever and shoe expanding means to automatically adjust the brake lever.

2. In a brake mechanism, a drum, brake shoes, a brake lever, a cam operated thereby for expanding the shoes into frictional engagement with the drum, and wear compensating means forming the operative connection between the brake lever and shoe expanding cam, to automatically adjust the brake lever.

3. In a brake mechanism, a drum, brake shoes, a brake lever, a cam shaft operated thereby for expanding the shoes into frictional engagement with the drum and wear compensating means forming the operative connection between the brake lever and cam shaft to automatically adjust the brake lever.

4. In a brake mechanism, a drum, brake shoes, a shoe expanding cam, its shaft, a brake lever loosely mounted on the shaft, and wear compensating means forming the operative connection between the brake lever and cam shaft, to automatically adjust the brake lever.

5. In a brake mechanism, a drum, brake shoes, a brake lever, a cam shaft operated thereby for expanding the shoes into frictional engagement with the drum and wear compensating means interposed between the brake lever and cam shaft to automatically adjust the brake lever comprising a ratchet fixed to the cam shaft, a trip lever, said brake lever and trip lever being loosely mounted on the cam shaft and having pawls engaging said ratchet, and fixed stops engaging the trip lever to limit its swinging movement.

In testimony, that I claim the foregoing as my invention, I have signed my name this twenty third day of February, 1916.

FINLEY R. PORTER.